United States Patent
Collins et al.

(10) Patent No.: US 8,989,513 B1
(45) Date of Patent: Mar. 24, 2015

(54) IDENTIFYING MARKERS ASSOCIATED WITH IT COMPONENTS IN AN IMAGE

(71) Applicant: EMC Corporation, Hopkinton, MA (US)

(72) Inventors: Daniel Collins, Princeton, MA (US); Russell Laporte, Webster, MA (US); Jun Liang, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 203 days.

(21) Appl. No.: 13/799,224

(22) Filed: Mar. 13, 2013

(51) Int. Cl.
*G06K 9/40* (2006.01)
*G06T 5/00* (2006.01)

(52) U.S. Cl.
CPC ..................................... *G06T 5/002* (2013.01)
USPC ......................................................... 382/262

(58) Field of Classification Search
None
See application file for complete search history.

(56) References Cited

U.S. PATENT DOCUMENTS

| 4,915,504 A * | 4/1990 | Thurston ....................... 356/604 |
| 2006/0129276 A1 * | 6/2006 | Watabe et al. ................ 700/245 |
| 2007/0064233 A1 * | 3/2007 | Takagi et al. .................. 356/401 |
| 2007/0257182 A1 * | 11/2007 | Sawada et al. ............. 250/201.3 |
| 2008/0246975 A1 * | 10/2008 | Poxon et al. .................... 358/1.1 |
| 2009/0052778 A1 * | 2/2009 | Edgecomb et al. ........... 382/188 |
| 2009/0245651 A1 * | 10/2009 | Friedhoff et al. ............. 382/199 |
| 2010/0054532 A1 * | 3/2010 | Mitte et al. .................... 382/101 |
| 2011/0103674 A1 * | 5/2011 | Chang et al. .................. 382/132 |
| 2012/0189202 A1 * | 7/2012 | Kan ............................... 382/176 |

* cited by examiner

*Primary Examiner* — Jingge Wu
(74) *Attorney, Agent, or Firm* — Proskauer Rose LLP

(57) ABSTRACT

Described are methods, systems, and apparatus, including computer program products for locating one or more markers associated with IT equipment. An image of a scene including the one or more markers is acquired by a mobile computing device. A band-pass filter is applied by the mobile computing device to first pixel data associated with a first pixel in the image to generate a first band-pass filter result, wherein a pass-band of the band-pass filter is based on the light emitted by the one or more markers. A first pixel score is determined by the mobile computing device based on at least the first band-pass filter result. First indicia of the first pixel score is stored by the mobile computing device in a map at a first map location corresponding to a first image location of the first pixel in the image.

25 Claims, 7 Drawing Sheets

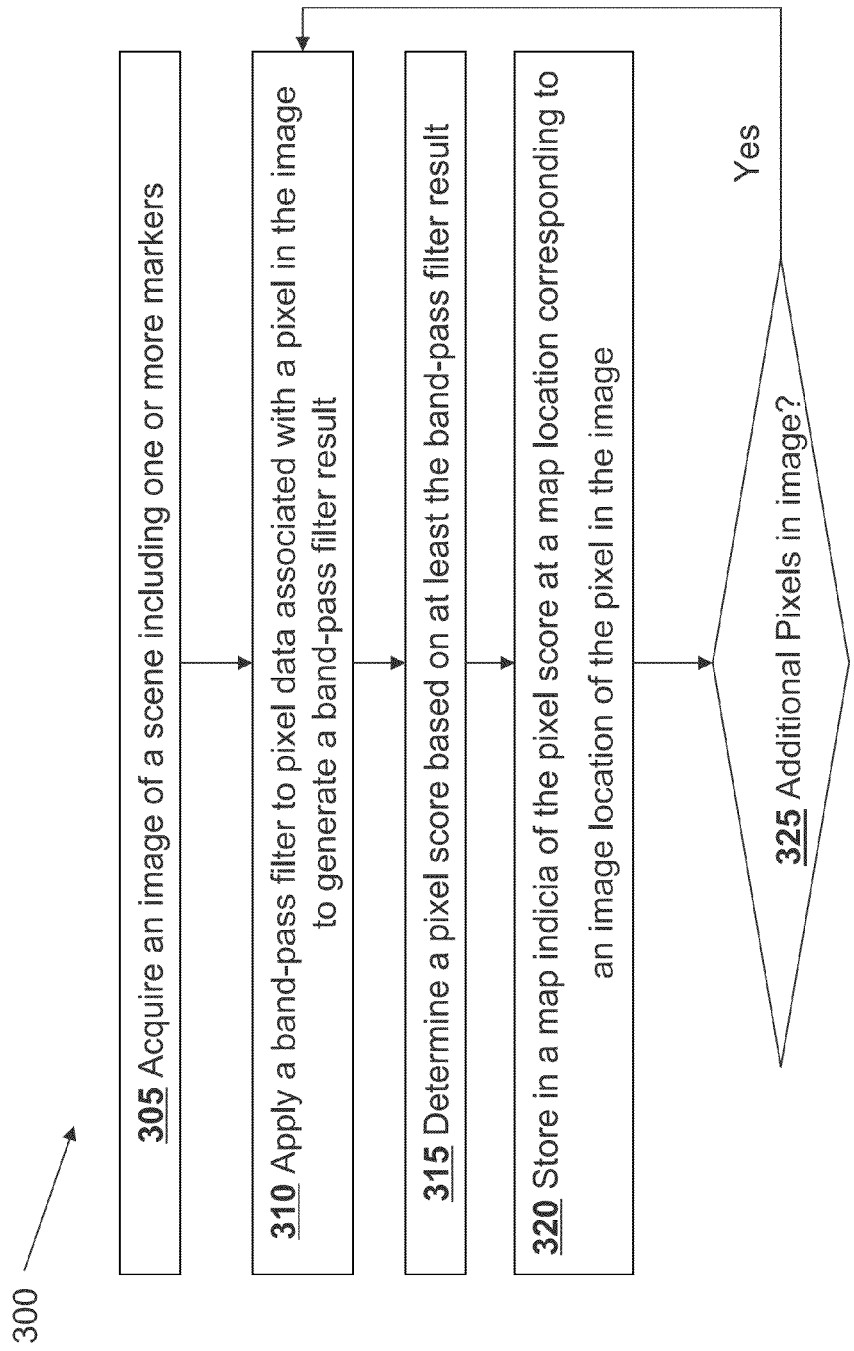

US 8,989,513 B1

IDENTIFYING MARKERS ASSOCIATED WITH IT COMPONENTS IN AN IMAGE

TECHNOLOGICAL FIELD

The present technology relates generally to identifying markers in an image, and more specifically to identifying markers associated with IT equipment in an image based on light emitted by the markers.

BACKGROUND

A data center can include various physical resources to support and provide, e.g., computer processing and/or storage. A data center can include IT components, such as racks, servers, data storage devices, disk drives, networking equipment, and uninterruptible power supplies (UPSs). Data centers can include supporting resources, such as HVAC units, chillers, cooling equipment, generators, and battery backup systems. In some cases, the physical resources of a data center can be housed in an enclosure, such as a room or building. For a large-scale service, a data center can require a large number of physical resources occupying one or more buildings.

There have been recent developments in mobile computing devices such as laptops, smart phones, and tablets. In particular, mobile computing devices can provide a variety of functions such as a digital camera.

SUMMARY

As the number of the IT components in data centers increase, the management of the data centers becomes increasingly complex. Accordingly, there is a need to simplify the management of data centers. As described herein, mobile computing devices can be used to identify IT components, thereby facilitating management.

In one aspect, there is a method executed on a mobile computing device for locating one or more markers associated with IT equipment. The method can include acquiring, by the mobile computing device, an image of a scene including the one or more markers. The method can include applying, by the mobile computing device, a band-pass filter to first pixel data associated with a first pixel in the image to generate a first band-pass filter result, wherein a pass-band of the band-pass filter is based on the light emitted by the one or more markers. The method can include determining, by the mobile computing device, a first pixel score based on at least the first band-pass filter result. The method can include storing, by the mobile computing device, in a map first indicia of the first pixel score at a first map location corresponding to a first image location of the first pixel in the image.

In some embodiments, the method can include applying, by the mobile computing device, the band-pass filter to second pixel data associated with a second pixel in the image to generate a second band-pass filter result. The method can include determining, by the mobile computing device, a second pixel score based on at least the second band-pass filter result. The method can include storing, by the mobile computing device, in the map second indicia of the second pixel score at a second map location corresponding to a second image location of the second pixel in the image.

In some embodiments, the method can include applying the band-pass filter to a hue value of the first pixel data.

In some embodiments, determining, by the mobile computing device, the first pixel score based on at least the first band-pass filter result includes determining the first pixel score based on the first band-pass filter result and a saturation value of the first pixel data.

In some embodiments, determining, by the mobile computing device, the first pixel score based on at least the first band-pass filter result includes determining the first pixel score based on the first band-pass filter result and a brightness value of the first pixel data.

In some embodiments, determining, by the mobile computing device, the first pixel score based on at least the first band-pass filter result includes determining the first pixel score based on the first band-pass filter result, a saturation value of the first pixel data, and a brightness value of the first pixel data.

In some embodiments, the method includes converting the first pixel data from an RGB domain to an HSB, HSV, or HSL domain.

In some embodiments, the method includes identifying, by the mobile computing device, the first pixel as associated with an LED of the one or more LEDs in the image if the pixel score exceeds a threshold.

In some embodiments, the method includes identifying, by the mobile computing device, the first pixel as associated with an LED of the one or more LEDs in the image based on an adjacent pixel score associated with an adjacent pixel adjacent to the first pixel in the image.

In another aspect, there is a computer program product, tangibly embodied in a non-transitory computer readable storage medium, including instructions being operable to cause a mobile computing device to: acquire an image of a scene including one or more markers associated with IT equipment; apply a band-pass filter to first pixel data associated with a first pixel in the image to generate a first band-pass filter result, wherein a pass-band of the band-pass filter is based on the light emitted by the one or more markers; determine a first pixel score based on at least the first band-pass filter result; and store in a map first indicia of the first pixel score at a first map location corresponding to a first image location of the first pixel in the image.

In some embodiments, the computer program product includes instructions being operable to cause a mobile computing device to apply the band-pass filter to second pixel data associated with a second pixel in the image to generate a second band-pass filter result; determine a second pixel score based on at least the second band-pass filter result; and store in the map second indicia of the second pixel score at a second map location corresponding to a second image location of the second pixel in the image.

In some embodiments, the computer program product includes instructions being operable to cause a mobile computing device to apply the band-pass filter to a hue value of the first pixel data.

In some embodiments, the instructions to determine a first pixel score based on at least the first band-pass filter result include instructions to determine the first pixel score based on the first band-pass filter result and a saturation value of the first pixel data.

In some embodiments, the instructions to determine a first pixel score based on at least the first band-pass filter result include instructions to determine the first pixel score based on the first band-pass filter result and a brightness value of the first pixel data.

In some embodiments, the instructions to determine a first pixel score based on at least the first band-pass filter result include instructions to determine the first pixel score based on the first band-pass filter result, a saturation value of the first pixel data, and a brightness value of the first pixel data.

In some embodiments, the computer program product includes instructions being operable to cause a mobile computing device to convert the first pixel data from an RGB domain to an HSB, HSV or HSL domain.

In some embodiments, the computer program product includes instructions being operable to cause a mobile computing device to identify the first pixel as associated with an LED of the one or more LEDs in the image if the pixel score exceeds a threshold.

In some embodiments, the computer program product includes instructions being operable to cause a mobile computing device to identify the first pixel as associated with an LED of the one or more LEDs in the image based on an adjacent pixel score associated with an adjacent pixel adjacent to the first pixel in the image.

In another aspect, there is a method executed on a mobile computing device for locating one or more light emitting diodes (LEDs) associated with one or more IT components. The method can include acquiring, by the mobile computing device, an image of a scene including the one or more LEDs, wherein the image has dimensions of N by M pixels. The method can include, for each pixel in the image: applying, by the mobile computing device, a band-pass filter to pixel data associated with the pixel to generate a band-pass filter result, wherein a pass-band of the band-pass filter is based on the light emitted by the one or more LEDs; determining, by the mobile computing device, a pixel score based on at least the band-pass filter result; and creating, by the mobile computing device, a map having dimensions N by M including indicia of the pixel score for each pixel at a map location corresponding to an image location of the pixel in the image.

In some embodiments, the first pixel score is the first band-pass filter result. In some embodiments, the first pixel data are in an HSB, HSV, or HSL domain. In some embodiments, the one or more markers comprise one or more light emitting diodes (LEDs).

Other aspects and advantages of the present technology will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present technology, as well as the invention itself, will be more fully understood from the following description of various embodiments, when read together with the accompanying drawings, in which:

FIG. 3 depicts a flow chart for a method of locating one or more markers associated with IT components in an image.

DETAILED DESCRIPTION

Figure 1A:
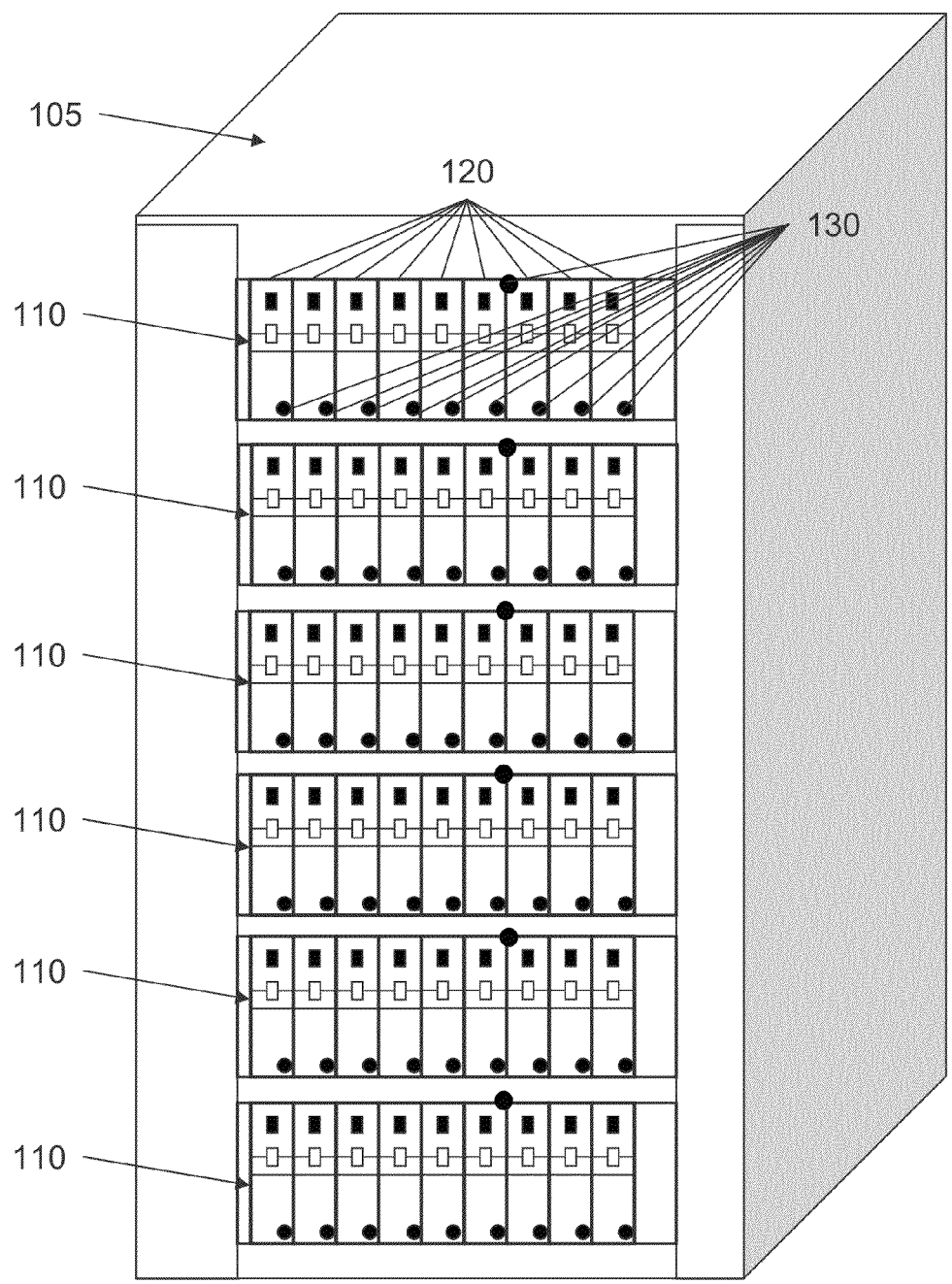
FIG. 1A depicts a rack including IT components.

In some applications, such as data center management applications or augmented reality applications, it can be beneficial to locate an IT component in an image. In some applications, a mobile computing device can be used to take an image of multiple IT components (e.g., multiple servers in a rack). It can be beneficial for the mobile computing device to be able to locate the various IT components in the image. For example, locating an IT component in the image can be useful for identifying the IT component or identifying the position and/or orientation of the IT component in the image. The technology described herein can be used to facilitate locating an IT component in an image based on markers (e.g., markers having known color and/or brightness properties) associated with the IT equipment. For example, an IT component can include one or more markers on its face, such as light emitting diodes (LEDs), florescent markers, etc. In some instances, the number of markers, arrangement of markers, or characteristics of light emitted by the markers can be unique to the particular IT component, the model of the IT component, or the brand of the IT component. Knowledge of the number of markers, arrangement of markers, and/or characteristics of light emitted by the markets on a particular IT component can be used to identify that IT component. For example, a particular IT component can be identified in an image of a rack containing multiple IT components based on the particular IT component's arrangement of markers and/or characteristics of the light emitted by the markers. As another example, the position and orientation of an IT component in an image can be determined based on how the markers appear in the image. Accordingly, being able to locate and identify the markers associated with IT components in an image can be useful for these and other applications.

Described herein is technology for identifying markers associated with IT equipment in an image. In some embodiments, the technology can analyze the pixels of an image to identify the location of one or more markers within the image (e.g., identify one or more pixels that likely are a part of the image of the marker). The technology described can leverage known characteristics of the light emitted by the markers to identify the markers in an image. In some embodiments, the technology involves applying a band-pass filter to each pixel in an image to determine if the pixel has characteristics associated with a marker. For example, the band-pass filter can have a pass-band approximately centered around the wavelength of the light emitted by the markers. In some embodiments where different markers can emit different wavelengths of light, multiple band-pass filters can be used. Using the band-pass filter, the technology can identify pixels with color that approximately matches the known wavelength of light emitted by the markers, and identify pixels that are likely associated with a marker (e.g., the pixel is part of the image of the marker). In some embodiments, the technology involves analyzing multiple characteristics of the pixel in order to determine whether the pixel is likely associated with a marker, as will be described in greater detail below. In some embodiments, the technology involves determining a pixel score for each pixel in the image. The pixel score can be used to determine which pixels are associated with markers (e.g., pixel scores above a threshold can be identified as associated with markers). In some embodiments, neighboring pixels can be analyzed and grouped as associated with the same marker.

In some embodiments, the technology can generate a map of pixel scores. The pixel score map can have the same dimensions as the original image, such that each pixel in the image has a corresponding location in the pixel score map. Beneficially, the pixel score map can facilitate quickly locating a marker in the original image. For example, an augmented reality application can determine the coordinates of a group of high-score pixels in the map and use those coordinates to find the corresponding marker in the image.

Figure 1B:
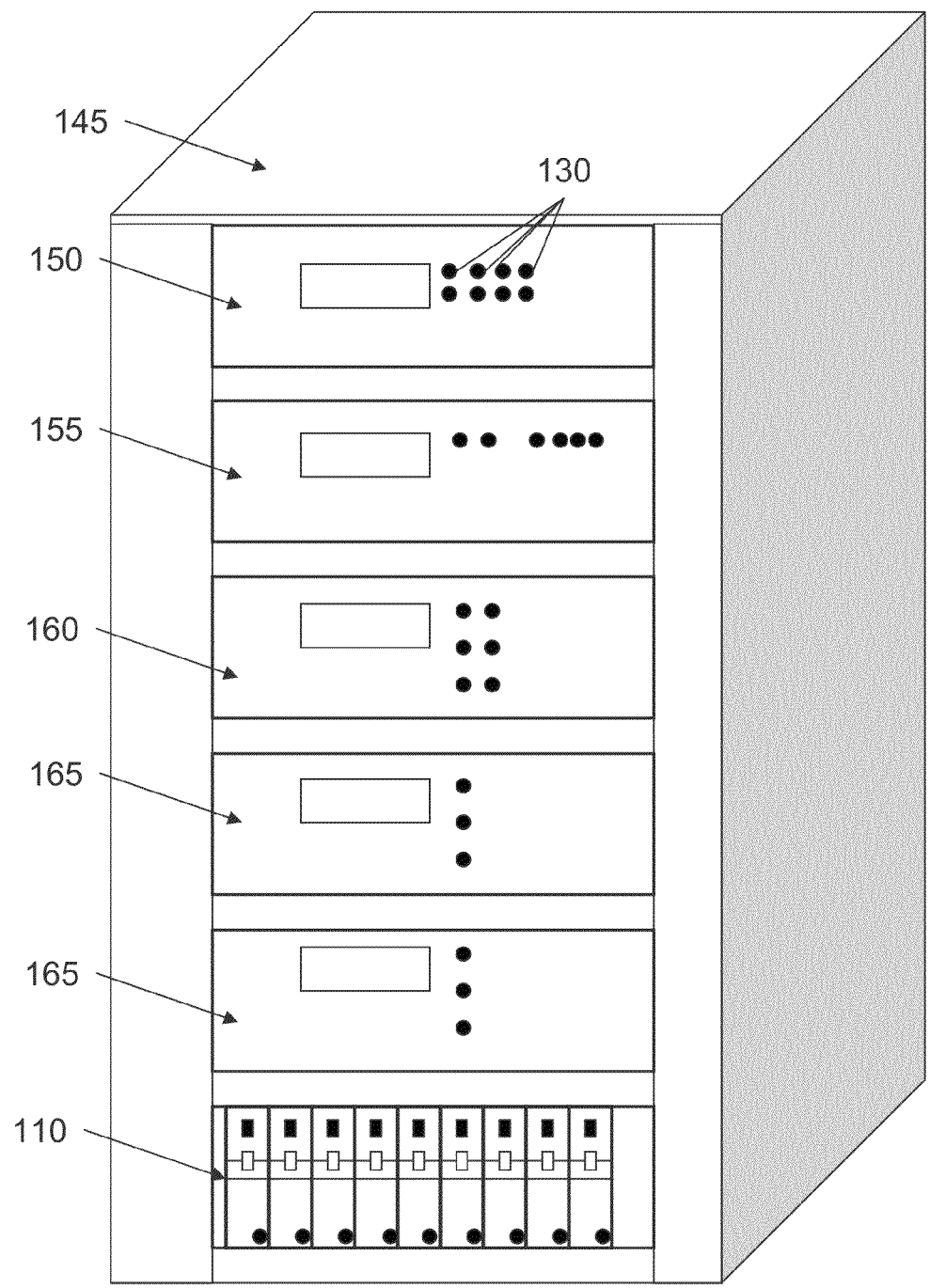
FIG. 1B depicts a rack including IT components.

FIG. 1A depicts rack 105 including IT components. As illustrated, rack 105 contains disk enclosures 110. Disk enclosures 110 contain hard disks 120. Disk enclosures 110 and/or hard disks 120 include LEDs 130. FIG. 1B depicts rack 145 including IT components. As illustrated, rack 145 contains disk enclosure 110 and servers 150, 155, 160, and 165. Servers 150, 155, 160, and 165 include LEDs 130.

As illustrated in FIGS. 1A and 1B, each of disk enclosures 110 and servers 150, 155, 160, and 165, has one or more LEDs 130 arranged on its face. As discussed above, the arrangement of LEDs 130 can be used to identify the type of IT equipment in an image (e.g., distinguish between disk enclosures 110 and servers 150, 155, 160, and 165 based on the arrangement of LEDs 130). In some applications, the arrangement of LEDs 130 can be used to determine the position of IT equipment in an image (e.g., determine the position of disk enclosures 110 based on the location and arrangement of LEDs 130 associated with disk enclosure 110).

Figure 2A:
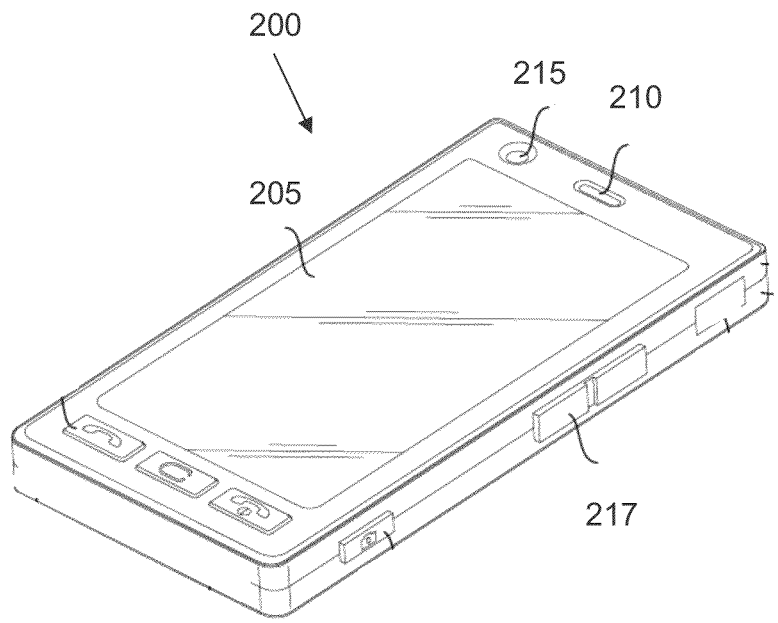
FIG. 2A depicts a front view of a mobile computing device.

FIG. 2A depicts a front view of mobile computing device 200. As shown in FIG. 2A, mobile computing device 200 can have a bar-type body. In some embodiments, a mobile computing device can be a smartphone, cellular phone, tablet computer, laptop computer, or other computing device that can be brought into a data center. Mobile computing device 200 can include display 205, audio output unit 210, camera 215, and user input unit 217. In some embodiments, display 205 can be touch sensitive (e.g., a user can provide input to mobile computing device by touching display 205).

Figure 2B:
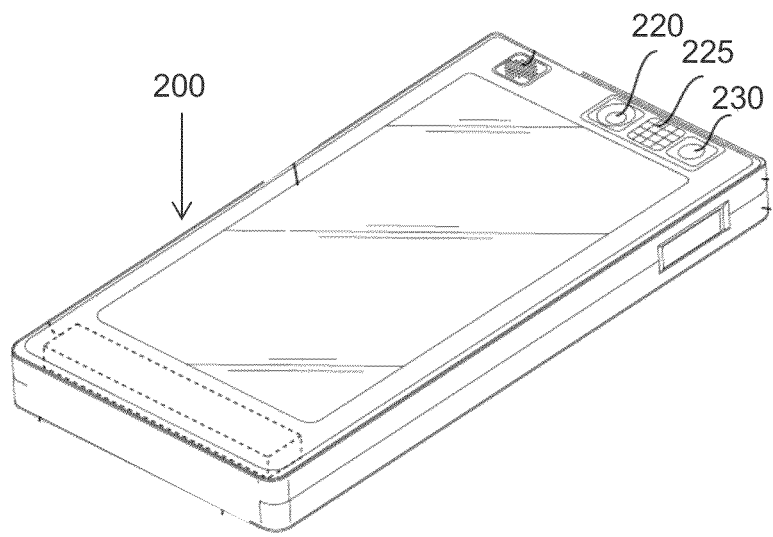
FIG. 2B depicts a back view of a mobile computing device.

FIG. 2B depicts a back view of mobile computing device 200. As shown in FIG. 2B, mobile computing device 200 can include camera 220. Camera 220 can have a photographing direction that is substantially opposite to a photographing direction of camera 215 and can have pixels differing from pixels of camera 215. Mobile computing device 200 can include flash 225 adjacent to the camera 220. Flash 225 can emit light toward a subject in case of photographing the subject using camera 220. Mobile computing device 200 can include antenna 230 for communication.

Figure 2C:
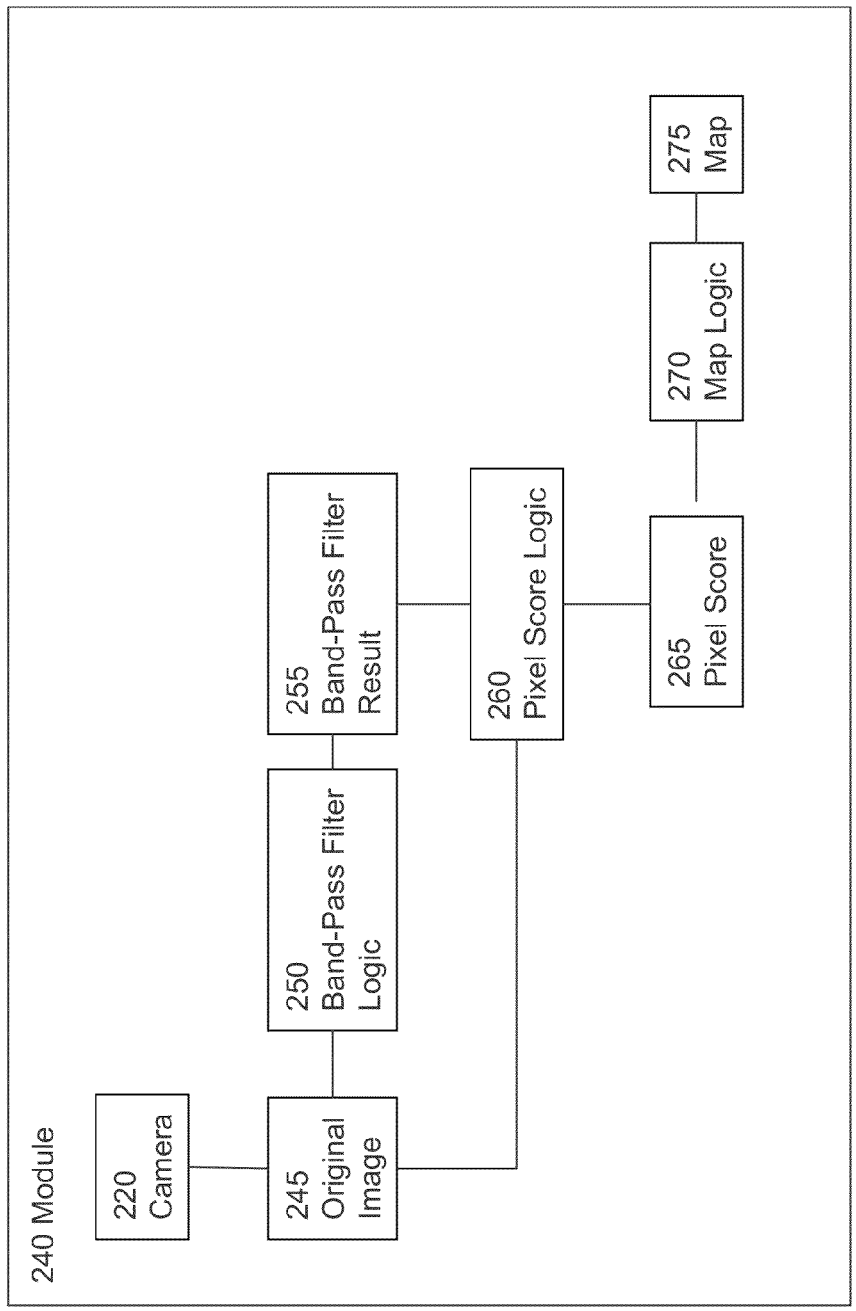
FIG. 2C depicts a block diagram of an analysis module of mobile computing device.

FIG. 2C depicts a block diagram of analysis module 240 of mobile computing device 200. Camera 220 can produce original image 245. Original image 245 can be a digital image. In some embodiments, each pixel of the image can have associated pixel data. The pixel data can be represented in the Hue, Saturation, and Value (HSV) representation, Hue, Saturation, and Brightness (HSB) representation, and/or Hue, Saturation, and Lightness (HSL) representation.

Band-pass filter logic 250 can include logic that can be used to apply band-pass filtering to one or more pixels in original image 245, to produce band-pass filter result 255. In some embodiments, the band-pass filter applied by band-pass filter logic 250 can be a band-pass filter for a wavelength of light (e.g., passes wavelengths of light within the pass-band and rejects wavelengths of light outside the pass-band). In some embodiments, one or more band-pass filters can be applied by band-pass filter logic 250, where each band-pass filter can be for a wavelength of light associated with a particular type of marker (e.g., a band-pass filter for light emitted by green LEDs and a band-pass filter for the light emitted by blue LEDs). Band-pass filter result 255 can be the output of band-pass filter logic 250. In some embodiments, the output of the band-pass filter applied by band-pass filter logic 250 can be numeric values that fall within a range (e.g., [0,1]) where pixels with color that falls within the pass-band result in output of numeric values in the high end of the range and pixels with color that falls outside the pass-band result in output of numeric values in the low end of the range. In some embodiments, the output of the band-pass filter applied by band-pass filter logic 250 can fall off exponentially with the magnitude of the difference between the color of the pixel and the pass band. In some embodiments, band-pass filter logic 250 can clip small values (e.g., output 0). In some embodiments, the output of the band-pass filter applied by band-pass filter logic 250 can be binary values, where pixels with color that falls within the pass-band result in output of a first value (e.g., 1) and pixels with color that falls outside the pass-band result in a second value (e.g., 0).

For example, in embodiments where original image 245 is in HSV, HSB, or HSL, the band-pass filter applied by band-pass filter logic 250 can be a band-pass filter for a particular Hue value or range of Hue values. In some embodiments, the particular Hue value can be the expected Hue of the light emitted by an LED on an IT component. Accordingly, application of the band pass filter can identify pixels in the image likely associated with an LED.

Pixel score logic 260 can determine pixel score 265 for a pixel based, in part, on band-pass filter result 255. In some embodiments, pixel score 265 can be band-pass filter result 255. In some embodiments, pixel score logic 260 can determine pixel score 265 based on band-pass filter result 255 and other attributes of the pixel being analyzed and/or other pixels from the image. Pixel score logic 260 can determine pixel score 265 based on band-pass filter result 255 and the saturation, brightness, value, and/or lightness of the pixel.

For example, in embodiments where original image 245 is in HSV, HSB, or HSL, pixel score logic 260 can determine pixel score 265 based on band-pass filter result 255 in combination with Saturation and/or Value, Saturation and/or Brightness, or Saturation and/or Lightness of the pixel. In some embodiments, pixel score 265 can be the sum or product of the band-pass filter result 255 and the Saturation and/or Value, Saturation and/or Brightness, or Saturation and/or Lightness of the pixel.

In some embodiments, pixel score logic 260 can determine pixel score 265 based on pixels that neighbor the pixel being analyzed. For example, if a pixel is surrounded by neighboring pixels with high pixel scores, pixel score 265 for the pixel being analyzed can be increased.

Map logic 270 can generate map 275 based pixel score 265. In some embodiments, map logic 270 can generate map 275 based on pixel scores 265 for each pixel of original image 245. For example, map 275 can be a 2 dimensional array of pixel scores 265. As another example, map 275 can be a gray scale image having the same dimensions as original image 245, where the appearance of each pixel of map 275 is based on pixel score 265 for the pixel at the corresponding location in original image 245 (e.g., highest pixel scores appear white and lowest pixel scores appear black). As another example, map 275 can include indicia of the pixel score along with indicia of the band-pass filter passed by the pixel (e.g., whether the pixel passed a band-pass filter for light emitted by a green LED or a blue LED). More generally, map 275 can be any collection of pixel scores that can be correlated to the pixels in original image 245.

FIG. 3 depicts flow chart 300 for a method of locating one or more markers associated with IT components in an image. In some embodiments, the illustrated method can be executed by mobile computing device 200. In some embodiments, the method can be executed multiple times, where each time a different band-pass filter is applied (e.g., applying a band-pass filter for the light emitted by a green LED and applying a band-pass filter for the light emitted by a blue LED) to generate multiple maps. At step 305, an image of a scene including one or more markers is acquired. In some embodiments, the image can be made up of pixels, each represented by pixel data. The pixel data can be in the Hue, Saturation, and Value (HSV) representation, Hue, Saturation, and Brightness (HSB) representation, and/or Hue, Saturation, and Lightness (HSL) representation. In some embodiments, the pixel data can be in the RGB representation and converted to HSV, HSB, or HSL. For example, camera 220 of mobile computing device 200 can acquire original image 245.

At step 310, a band-pass filter is applied to pixel data associated with a pixel in the image to generate a band-pass filter result. In some embodiments, the band-pass filter can be for a wavelength of light associated with the light emitted by the markers (e.g., passes or selects wavelengths of light within a pass-band centered around the light emitted by the markers and rejects wavelengths of light outside the pass-band). For example, band-pass filter logic 250 can apply a band-pass filter centered around a particular Hue to generate band-pass filter result 255. In some embodiments, one or more band-pass filters can be applied by band-pass filter logic 250 (e.g., a band-pass filter for light emitted by green LEDs and a band-pass filter for the light emitted by blue LEDs).

At step 315, a pixel score is determined based on at least the band-pass filter result. For example, pixel score logic 260 can determine pixel score 265 for a pixel based, in part, on band-pass filter result 255. Pixel score logic 260 can determine pixel score 265 based on band-pass filter result 255 and other attributes of the pixel being analyzed and/or other pixels from the image, such as the saturation, brightness, and/or lightness value of the pixel. Pixel score logic 260 can determine pixel score 265 based on pixels that neighbor the pixel being analyzed.

At step 320, indicia of the pixel score is stored in a map at a map location corresponding to an image location of the pixel in the image. For example, map logic 270 can store pixel score 265 in map 275. Pixel score 265 can be stored to map 275 at a location corresponding to the location of the pixel in the image.

At step 325, it is determined whether there are additional pixels in the image. If there are additional pixels in the image to analyze, the method performs steps 310, 315, and 320 for the each of the remaining pixels.

Figure 4:
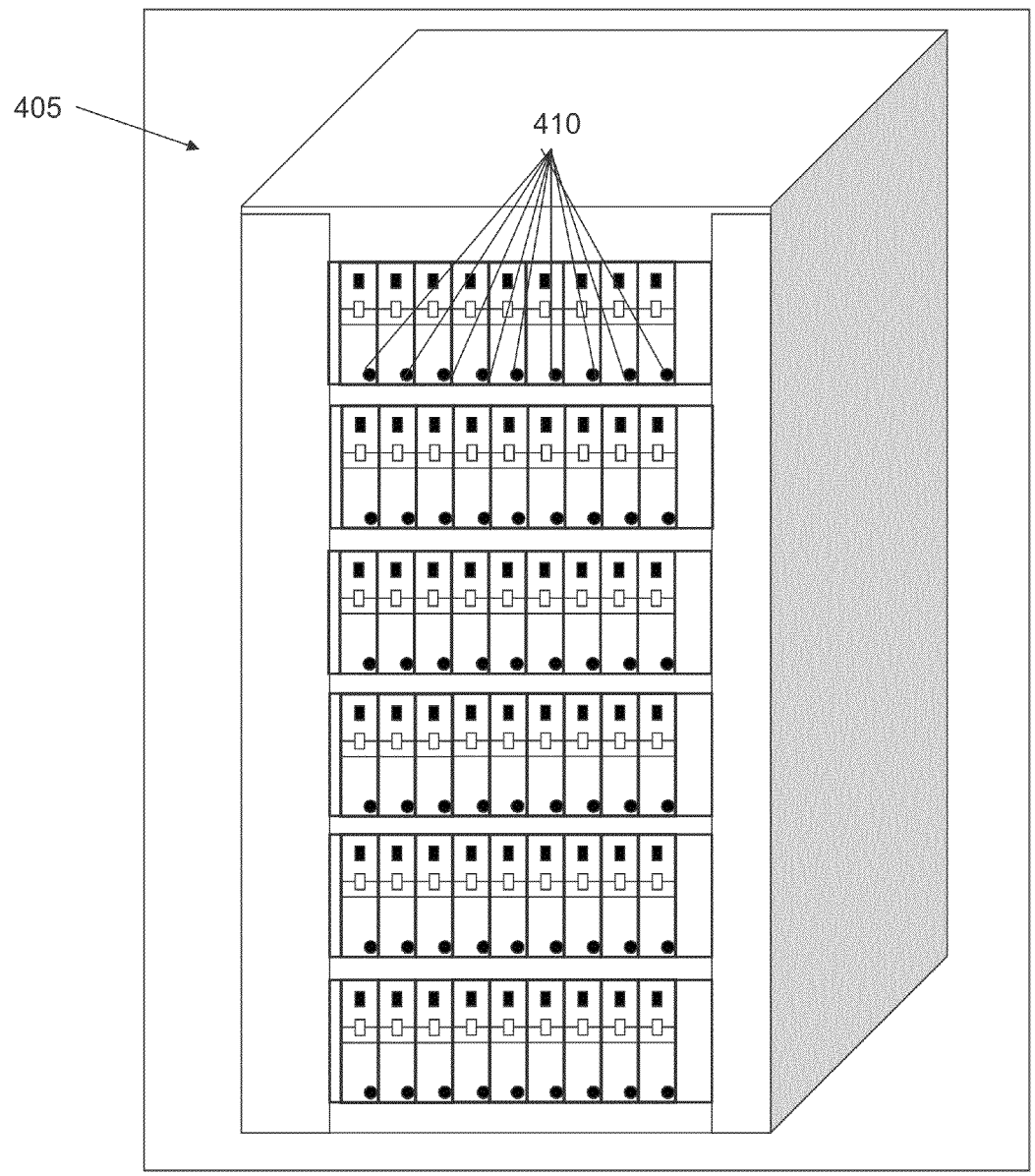
FIG. 4 illustrates an image.
Figure 5:
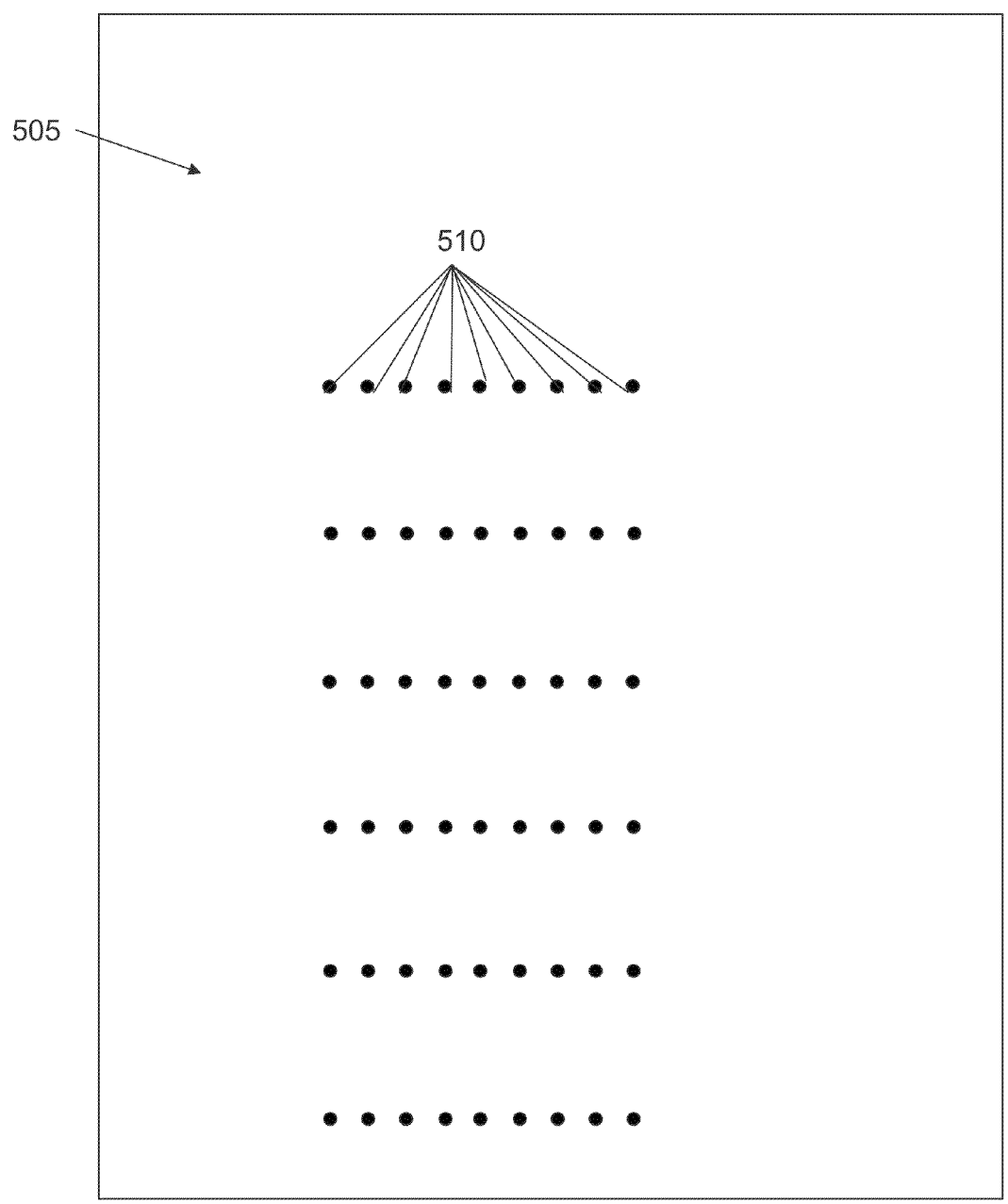
FIG. 5 illustrates a map.

With reference to FIGS. 4 and 5, an exemplary correspondence between an image (e.g., original image 245) and an associated map (e.g., map 275) is illustrated. FIG. 4 illustrates image 405. FIG. 5 illustrates map 505. Image 405 can be analyzed as described herein to produce map 505. As illustrated, image 405 includes multiple IT components and LEDs 410. Map 505 includes indicia 510 corresponding to LEDs 410. As illustrated, each of indicia 510 corresponds to an LED 410. Beneficially, map 505 isolates the location of LEDs 410 in image 405.

As described above, in some embodiments, the technology can be used to identify IT components. An IT component can be identified by finding a known configuration of markers for an IT component that approximately matches the map generated (e.g., map 275). In some embodiments, the technology can include applying multiple band-pass filters based on the known configuration of markers for an IT component. For example, a disk enclosure with multiple hard drives can be known to have a row of green LEDs (e.g., LEDs on the hard disks) and a blue LED located above the row of green LEDs (e.g., disk enclosure 110). The technology can locate a similar row of green LEDs in an image (e.g., by applying a band-pass filter for the light emitted by the green LEDs). To increase confidence that the row of green LEDs found in the image is associated with a disk enclosure, the technology can then apply a band-pass filter for blue LEDs to determine if a blue LED appears in the image at the location where the disk enclosure's blue LED is expected to be.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method executed on a mobile computing device for locating one or more markers associated with IT equipment comprising:
    acquiring, by the mobile computing device, an image of a scene including the one or more markers;
    applying, by the mobile computing device, a band-pass filter to first pixel data associated with a first pixel in the image to generate a first band-pass filter result, wherein a pass-band of the band-pass filter is based on the light emitted by the one or more markers;
    determining, by the mobile computing device, a first pixel score based on at least the first band-pass filter result;
    storing, by the mobile computing device, in a map first indicia of the first pixel score at a first map location corresponding to a first image location of the first pixel in the image.

2. The method of claim 1, further comprising:
    applying, by the mobile computing device, the band-pass filter to second pixel data associated with a second pixel in the image to generate a second band-pass filter result;
    determining, by the mobile computing device, a second pixel score based on at least the second band-pass filter result;
    storing, by the mobile computing device, in the map second indicia of the second pixel score at a second map location corresponding to a second image location of the second pixel in the image.

3. The method of claim 1, wherein the first pixel score is the first band-pass filter result.

4. The method of claim 1, wherein the first pixel data are in an HSB, HSV or HSL domain.

5. The method of claim 4, further comprising applying the band-pass filter to a hue value of the first pixel data.

6. The method of claim 4, wherein determining, by the mobile computing device, the first pixel score based on at least the first band-pass filter result comprises determining the first pixel score based on the first band-pass filter result and a saturation value of the first pixel data.

7. The method of claim 4, wherein determining, by the mobile computing device, the first pixel score based on at least the first band-pass filter result comprises determining the first pixel score based on the first band-pass filter result and a brightness value of the first pixel data.

8. The method of claim 4, wherein determining, by the mobile computing device, the first pixel score based on at least the first band-pass filter result comprises determining the first pixel score based on the first band-pass filter result, a saturation value of the first pixel data, and a brightness value of the first pixel data.

9. The method of claim 1, further comprising converting the first pixel data from an RGB domain to an HSB, HSV or HSL domain.

10. The method of claim 1, wherein the one or more markers comprise one or more light emitting diodes (LEDs).

11. The method of claim 10, further comprising:
    identifying, by the mobile computing device, the first pixel as associated with an LED of the one or more LEDs in the image if the pixel score exceeds a threshold.

12. The method of claim 10, further comprising:
    identifying, by the mobile computing device, the first pixel as associated with an LED of the one or more LEDs in the image based on an adjacent pixel score associated with an adjacent pixel adjacent to the first pixel in the image.

13. A computer program product, tangibly embodied in a non-transitory computer readable storage medium, comprising instructions being operable to cause a mobile computing device to:
    acquire an image of a scene including one or more markers associated with IT equipment;
    apply a band-pass filter to first pixel data associated with a first pixel in the image to generate a first band-pass filter result, wherein a pass-band of the band-pass filter is based on the light emitted by the one or more markers;
    determine a first pixel score based on at least the first band-pass filter result;
    store in a map first indicia of the first pixel score at a first map location corresponding to a first image location of the first pixel in the image.

14. The computer program product of claim 13, further comprising instructions being operable to cause a mobile computing device to:
    apply the band-pass filter to second pixel data associated with a second pixel in the image to generate a second band-pass filter result;
    determine a second pixel score based on at least the second band-pass filter result;
    store in the map second indicia of the second pixel score at a second map location corresponding to a second image location of the second pixel in the image.

15. The computer program product of claim 13, wherein the first pixel score is the first band-pass filter result.

16. The computer program product of claim 13, wherein the first pixel data are in an HSB, HSV or HSL domain.

17. The computer program product of claim 13, further comprising instructions being operable to cause a mobile computing device to apply the band-pass filter to a hue value of the first pixel data.

18. The computer program product of claim 13, wherein the instructions to determine a first pixel score based on at least the first band-pass filter result comprise instructions to determine the first pixel score based on the first band-pass filter result and a saturation value of the first pixel data.

19. The computer program product of claim 13, wherein the instructions to determine a first pixel score based on at least the first band-pass filter result comprise instructions to determine the first pixel score based on the first band-pass filter result and a brightness value of the first pixel data.

20. The computer program product of claim 13, wherein the instructions to determine a first pixel score based on at least the first band-pass filter result comprise instructions to determine the first pixel score based on the first band-pass filter result, a saturation value of the first pixel data, and a brightness value of the first pixel data.

21. The computer program product of claim 13, further comprising instructions being operable to cause a mobile computing device to convert the first pixel data from an RGB domain to an HSB or HSL domain.

22. The computer program product of claim 13, wherein the one or more markers comprise one or more light emitting diodes (LEDs).

23. The computer program product of claim 22, further comprising instructions being operable to cause a mobile computing device to:
    identify the first pixel as associated with an LED of the one or more LEDs in the image if the pixel score exceeds a threshold.

24. The computer program product of claim 22, further comprising instructions being operable to cause a mobile computing device to:
    identify the first pixel as associated with an LED of the one or more LEDs in the image based on an adjacent pixel score associated with an adjacent pixel adjacent to the first pixel in the image.

25. A method executed on a mobile computing device for locating one or more light emitting diodes (LEDs) associated with one or more IT components comprising:

acquiring, by the mobile computing device, an image of a scene including the one or more LEDs, wherein the image has dimensions of N by M pixels;

for each pixel in the image:

applying, by the mobile computing device, a band-pass filter to pixel data associated with the pixel to generate a band-pass filter result, wherein a pass-band of the band-pass filter is based on the light emitted by the one or more LEDs;

determining, by the mobile computing device, a pixel score based on at least the band-pass filter result;

creating, by the mobile computing device, a map having dimensions N by M comprising indicia of the pixel score for each pixel at a map location corresponding to an image location of the pixel in the image.

* * * * *